Sept. 23, 1924.

J. L. G. DYKES 1,509,814

METHOD FOR MAKING PNEUMATIC TIRE CASINGS

Filed March 14, 1921  9 Sheets-Sheet 1

Inventor:
John L. G. Dykes
by Arthur F. Durand
Atty

Sept. 23, 1924.   1,509,814
J. L. G. DYKES
METHOD FOR MAKING PNEUMATIC TIRE CASINGS
Filed March 14, 1921   9 Sheets-Sheet 2
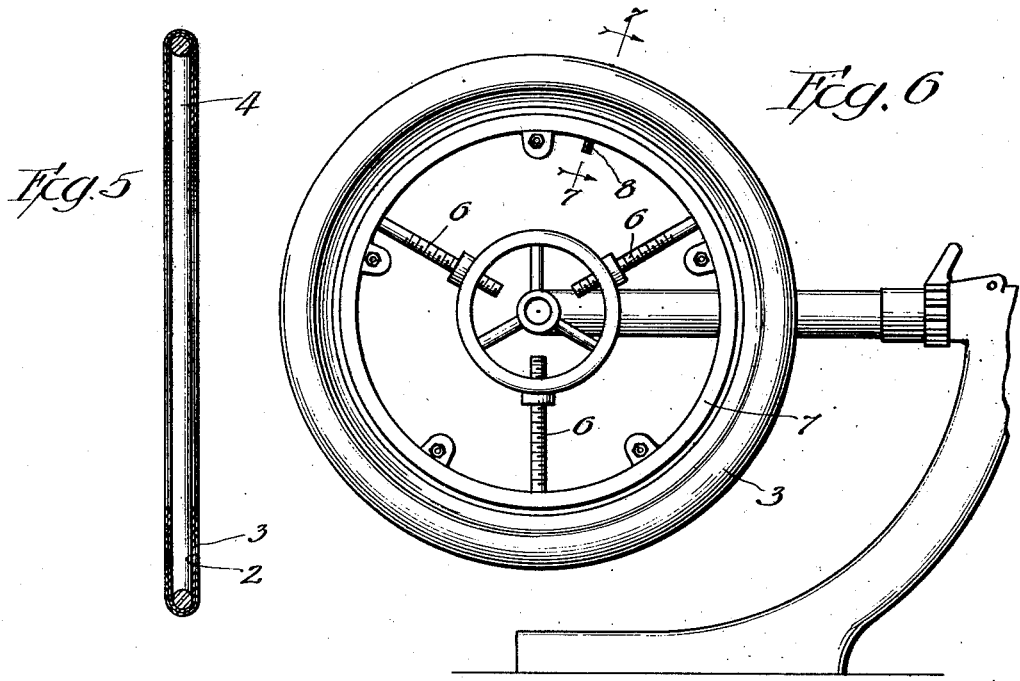
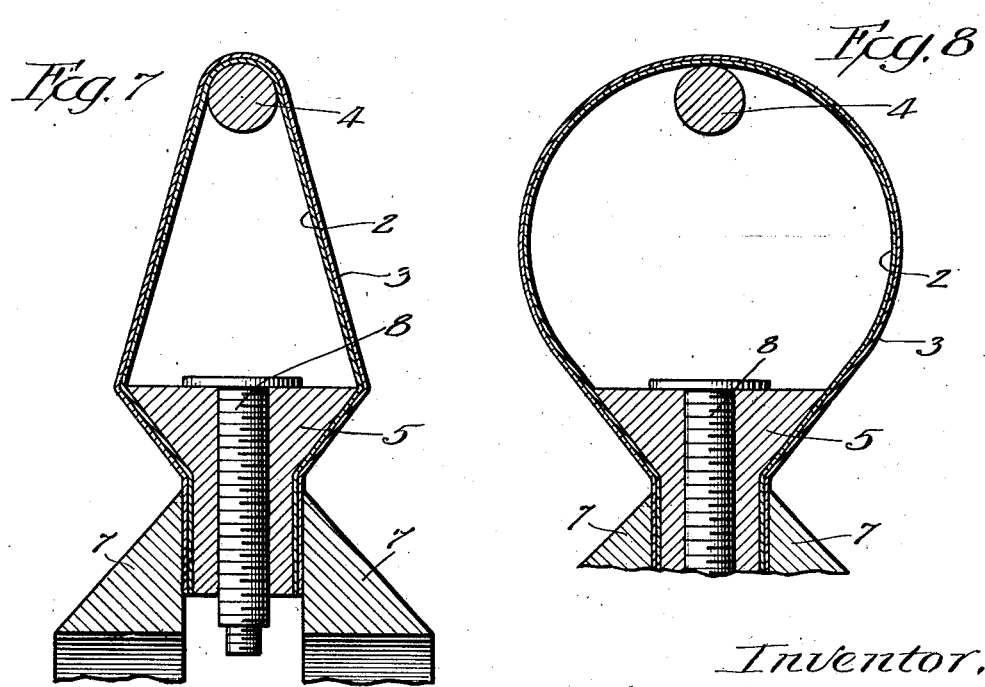
Inventor:
John L. G. Dykes
by Arthur F. Durand
Atty Sept. 23, 1924.
J. L. G. DYKES
METHOD FOR MAKING PNEUMATIC TIRE CASINGS
Filed March 14, 1921
1,509,814
9 Sheets-Sheet 3
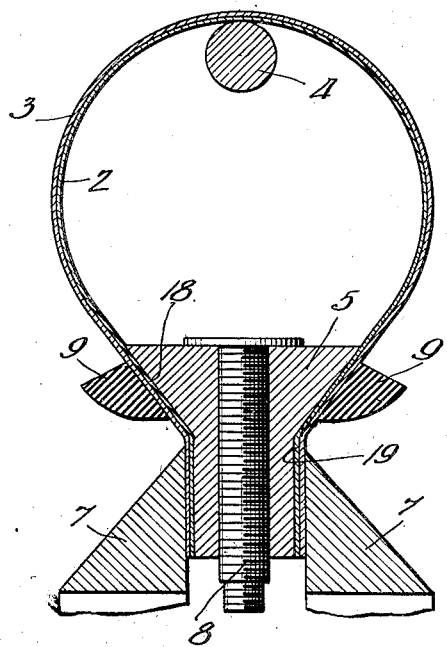
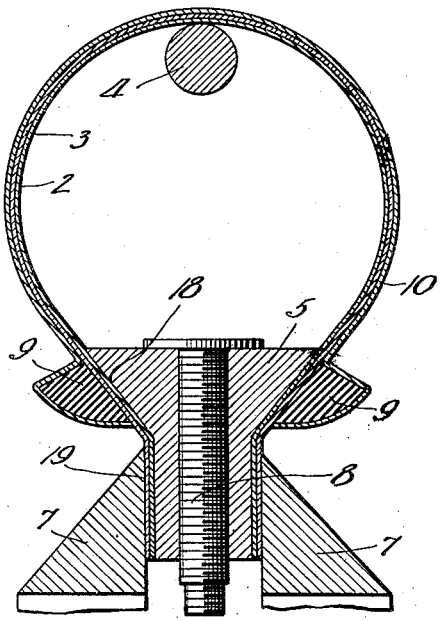
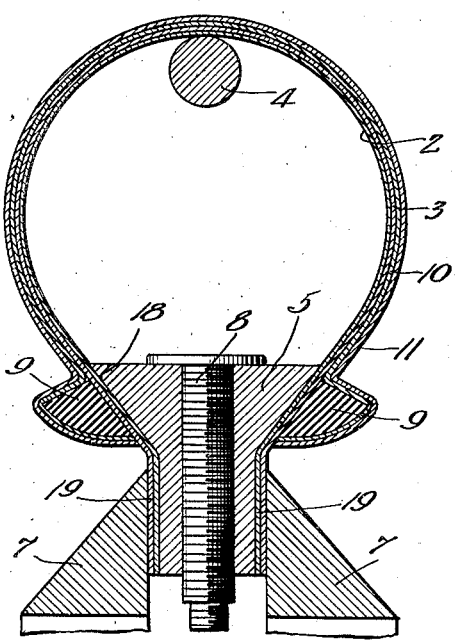
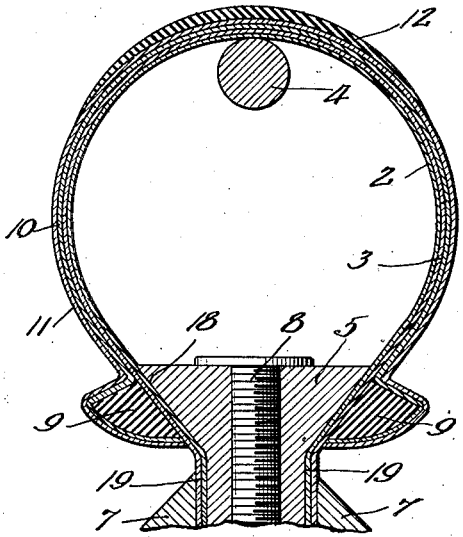
Inventor
John L. G. Dykes
by Arthur F. Durand
Atty Sept. 23, 1924.
J. L. G. DYKES
1,509,814
METHOD FOR MAKING PNEUMATIC TIRE CASINGS
Filed March 14, 1921   9 Sheets-Sheet 4
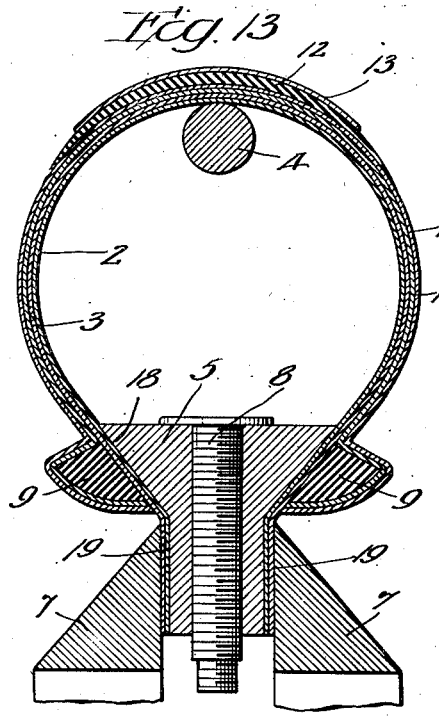
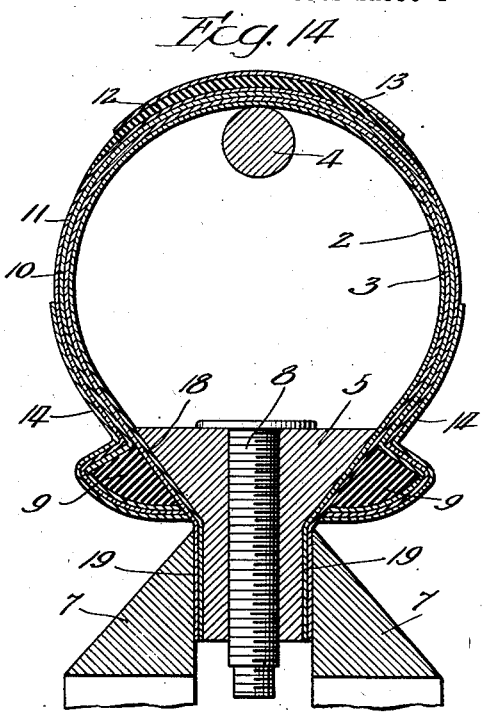
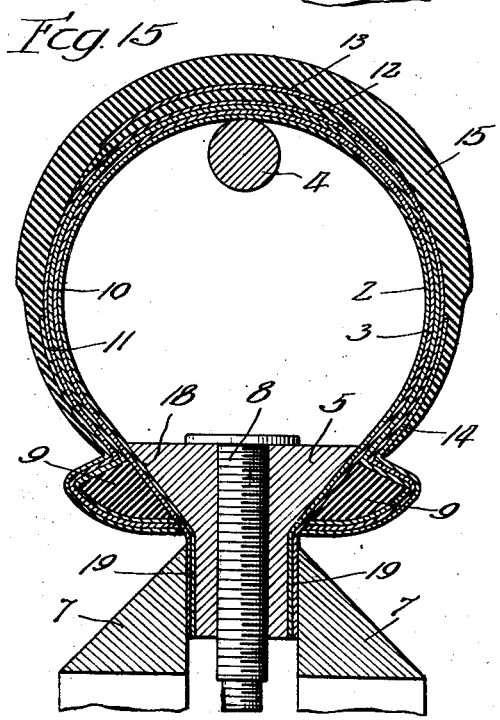
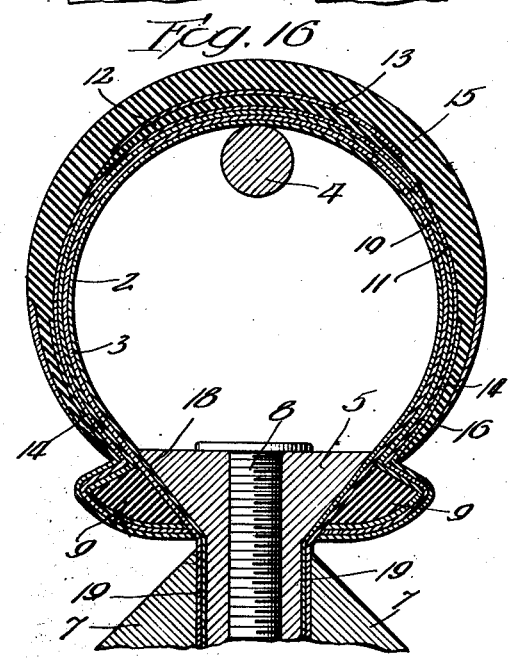
Inventor:
John L. G. Dykes
by Arthur F. Durand
Atty Sept. 23, 1924.

1,509,814

J. L. G. DYKES

METHOD FOR MAKING PNEUMATIC TIRE CASINGS

Filed March 14, 1921    9 Sheets-Sheet 5

Inventor:
John L. G. Dykes
by Arthur F. Durand
Atty

Sept. 23, 1924.

J. L. G. DYKES 1,509,814

METHOD FOR MAKING PNEUMATIC TIRE CASINGS

Filed March 14, 1921   9 Sheets-Sheet 7

Inventor:
John L. G. Dykes
by Arthur F. Durand
Atty

Sept. 23, 1924.

J. L. G. DYKES 1,509,814

METHOD FOR MAKING PNEUMATIC TIRE CASINGS

Filed March 14, 1921     9 Sheets-Sheet 8

Inventor:
John L. G. Dykes
by Arthur F. Durand
Atty

Sept. 23, 1924.  
J. L. G. DYKES  
METHOD FOR MAKING PNEUMATIC TIRE CASINGS  
Filed March 14, 1921   9 Sheets-Sheet 9

1,509,814

Inventor:  
John L. G. Dykes  
by Arthur H. Durand  
Atty

Patented Sept. 23, 1924.

1,509,814

UNITED STATES PATENT OFFICE.

JOHN L. G. DYKES, OF CHICAGO, ILLINOIS, ASSIGNOR, BY MESNE ASSIGNMENTS, TO HELLER-DYKES CORPORATION, A CORPORATION OF ILLINOIS.

METHOD FOR MAKING PNEUMATIC-TIRE CASINGS.

Application filed March 14, 1921. Serial No. 452,017.

*To all whom it may concern:*

Be it known that I, JOHN L. G. DYKES, of Chicago, Cook County, Illinois, have invented a certain new and useful Improvement in Methods for Making Pneumatic-Tire Casings, of which the following is a specification.

This invention relates to the manufacture of pneumatic tires, and more particularly to those ordinarily known as clincher tires, or tires in which the shoe or outer casing is divided along the base thereof, forming beads or side portions which are held in place in any suitable or desired manner by the channel rim in which the tire is mounted on the wheel, and in which an inner tube is employed to inflate or expand the tire, in the usual or well known manner, when the tire is in use on the wheel of an automobile or other vehicle.

Generally stated, the object of the invention is to provide an improved method or process of manufacture whereby tire casings of this general character or of any suitable or desired form can be made without the necessity of using either a mandrel or an air bag during the vulcanizing of the tire casing, the latter being expanded by the introduction of air or other fluid or substance directly into the interior thereof, so that the casing is molded and formed and vulcanized under pressure, by means of any suitable or desired apparatus, but without the necessity of employing either an air bag or a metal or other pre-formed mandrel to maintain the casing in expanded condition during the molding and vulcanizing thereof.

It is also an object to provide certain details and features of improvement tending to increase the general efficiency and desirability of a pneumatic tire casing and the process of manufacture thereof, as will hereinafter more fully appear, of this particular character.

To these and other useful ends the invention consists in matters hereinafter set forth and claimed and shown by the accompanying drawings in which:

Figure 5 is a sectional view showing the next step in the method or process which consists in stretching the center or tread portion of the band to a larger diameter.

Figure 6 shows a machine for holding the molding ring in position to receive the tire casing thereon.

Figure 7 shows the next step in the process or method, which consists in clamping the marginal portions of the fabric band to the sides of the ring.

Figure 8 shows the next step in the process, which consists in partially inflating the band, thus stretched to a larger diameter, and clamping it to said ring.

Figure 9 shows the next step in said process or method, which consists in applying the beads or retaining members to the sides of the tire casing, thus partially formed.

Figure 10 is a similar cross sectional view illustrating the next step in the process or method, which consists in applying another layer of rubberized fabric to the outer surface of the tire casing thus partially formed, and extending this third layer or ply of rubberized fabric over the said beads or retaining members.

Figure 11 shows the next step or process in said method, which consists in applying a fourth layer or ply of rubberized fabric to the outer surface of the tire casing thus partially formed.

Figure 12 is a similar view showing the next step in said process or method, which consists in applying some raw rubber to the tread portion of the tire casing.

Figure 13 is a similar view showing the next step in said process or method, which consists in applying a breaker strip or reinforcing strip of fabric to the tread of the tire casing.

Figure 14 is a similar view illustrating the next step in the process or method, which consists in the application of reinforcing strips or plies of rubberized fabric to the sides of the casing, in the manner shown.

Figure 15 is a similar view showing the next step in the process or method, which consists in applying the outer layer of tread rubber to the tread and side portions of the tire casing.

Figure 16 is a similar view showing the next step in the process or method, which consists in applying reinforcing strips along the sides of the tire casing adjacent to the beads or retaining members.

Figure 17:
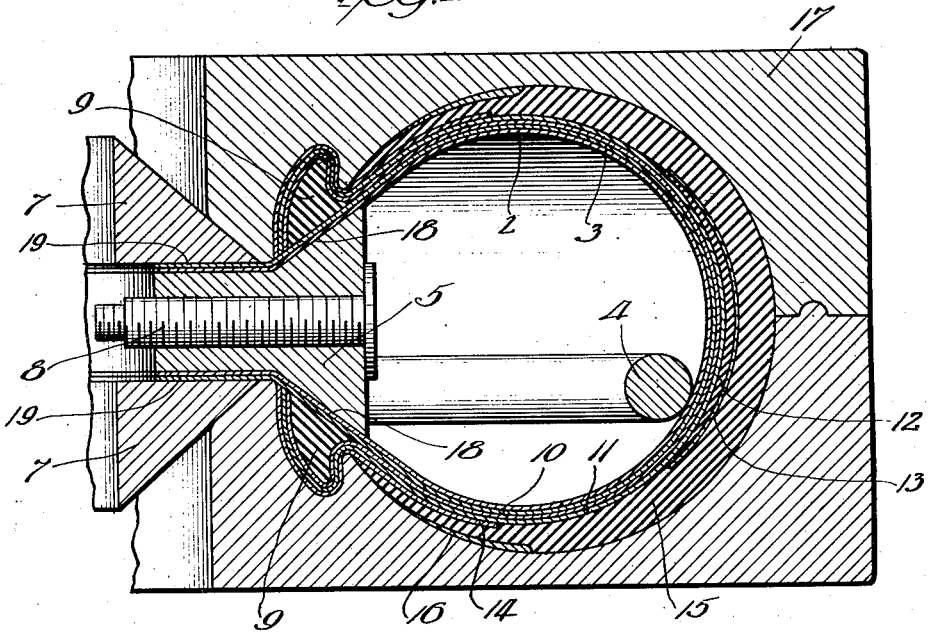

Figure 17 is a similar view showing the tire casing in the mold and showing it inflated to the fullest extent, so that the sectional ring (by which the rubberized fabric was first stretched to a larger diameter) in the position which it occupies during vulcanization of the tire casing, the latter being still clamped tightly to the ring to which the edge portions of the tire casing become vulcanized during the process.

Figure 18:
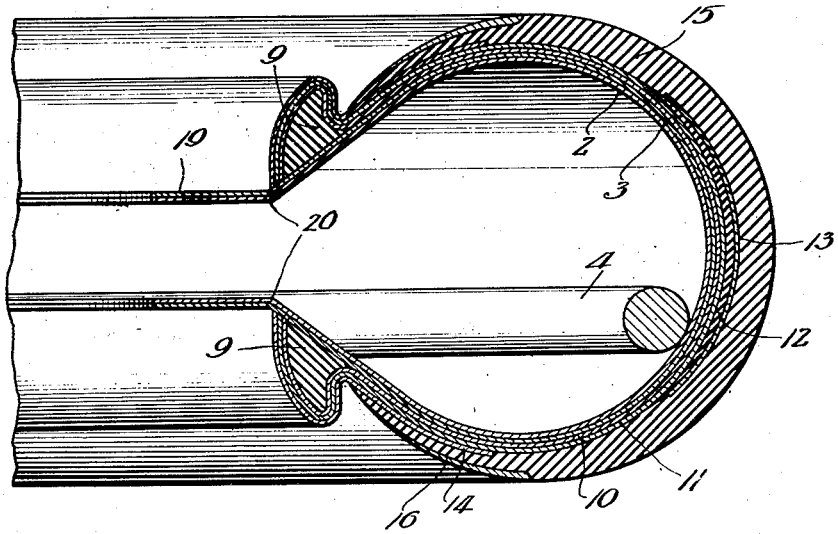

Figure 18 shows the tire casing removed from the vulcanizing mold or press and shows the rim portions of the casing detached from the molding ring.

Figure 19:
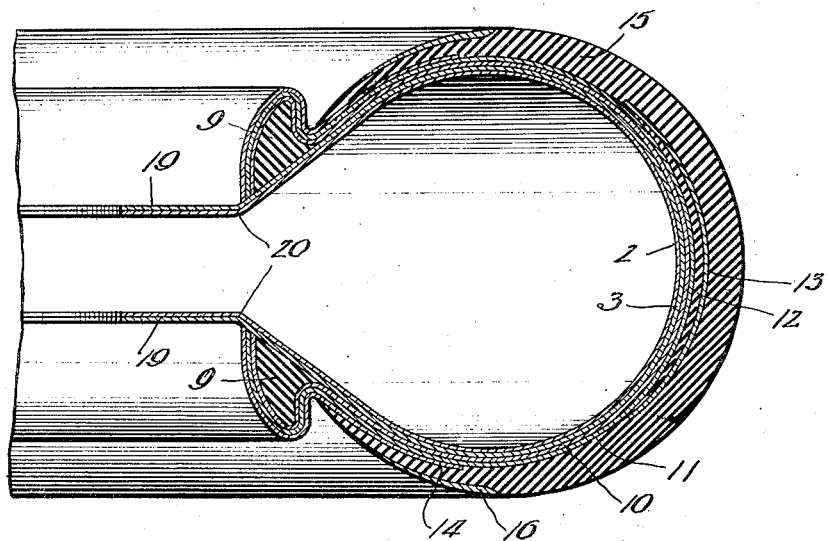

Figure 19 is a similar view showing the tire casing with the said sectional or expansible ring removed from the interior thereof.

Figure 20:
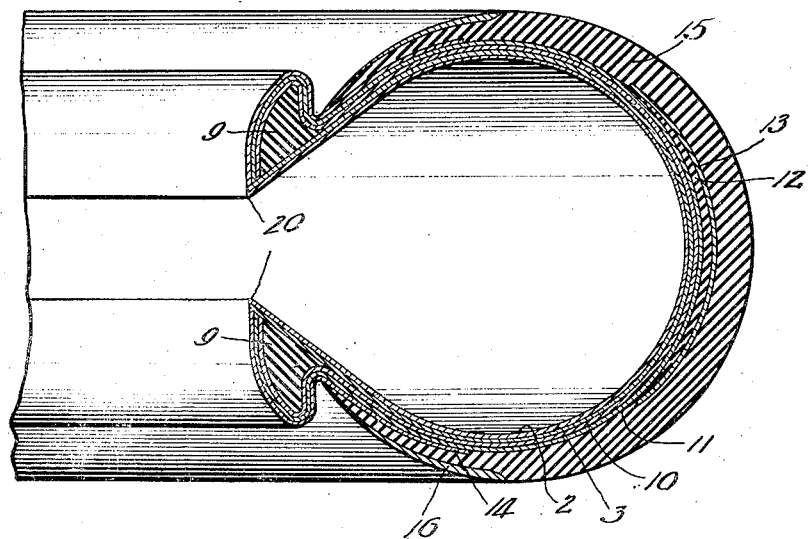

Figure 20 is a similar view showing the vulcanized tire casing in finished condition, the surplus edge portions (which were vulcanized to the molding ring) having been trimmed off or cut away in any suitable or desired manner.

Figure 21:
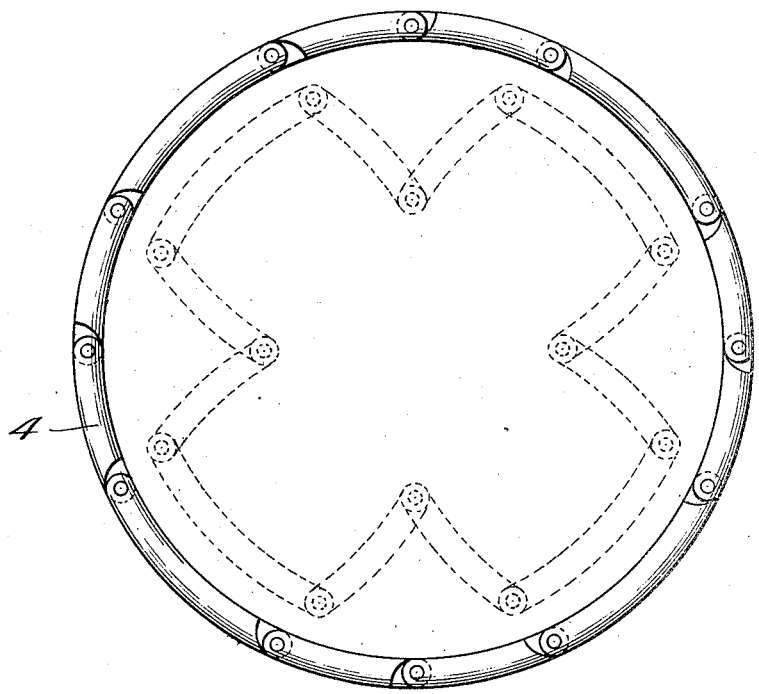

Figure 21 shows the sectional or expansible ring or annular member employed to stretch the band of fabric, this ring being in the nature of an undersized mandrel on which the materials are stretched in the moulding of the raw carcass.

Figure 22:
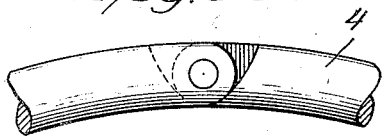

Figure 22 is an enlarged fragmentary detail view of a portion of the ring shown in Figure 21.

Figure 23:

Figure 23 is a plan of the portion shown in Figure 22.

Figure 24:
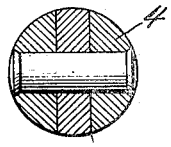

Figure 24 is an enlarged cross section through one of the joints of said ring.

Figure 25:
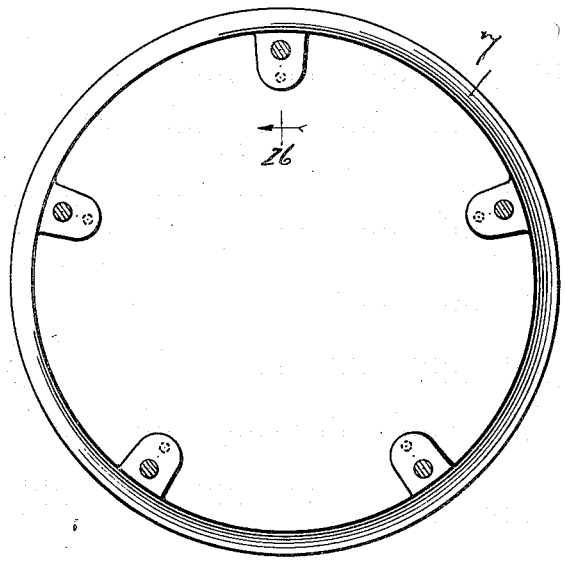

Figure 25 is a side elevation of one of the clamping rings employed to clamp the tire casing to the molding ring.

Figure 26:
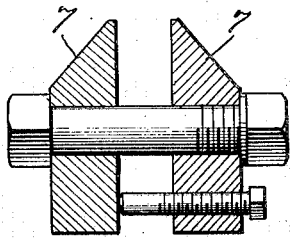

Figure 26 is an enlarged cross section of the two clamping rings by which the edge portions of the tire casing are clamped to the molding ring.

Figure 27:
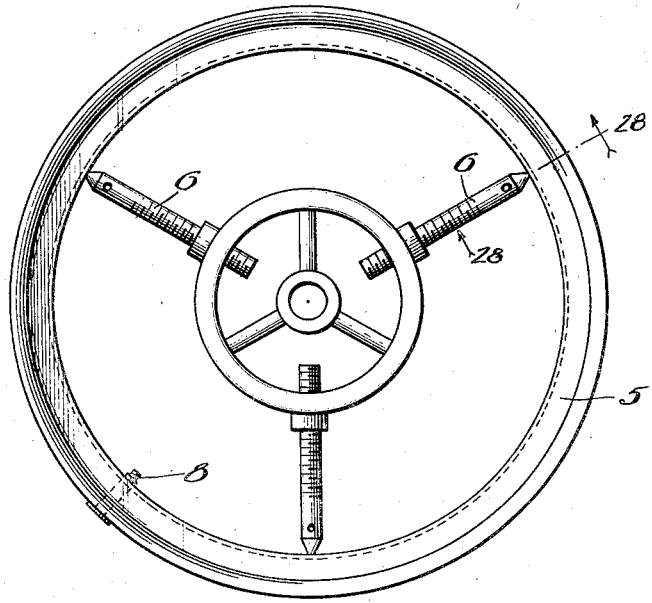

Figure 27 is an enlarged side elevation of a portion of the machine shown in Figure 26.

Figure 28:
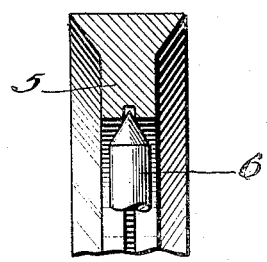

Figure 28 is an enlarged detail sectional view on line 28—28 in Figure 27.

Figure 29:
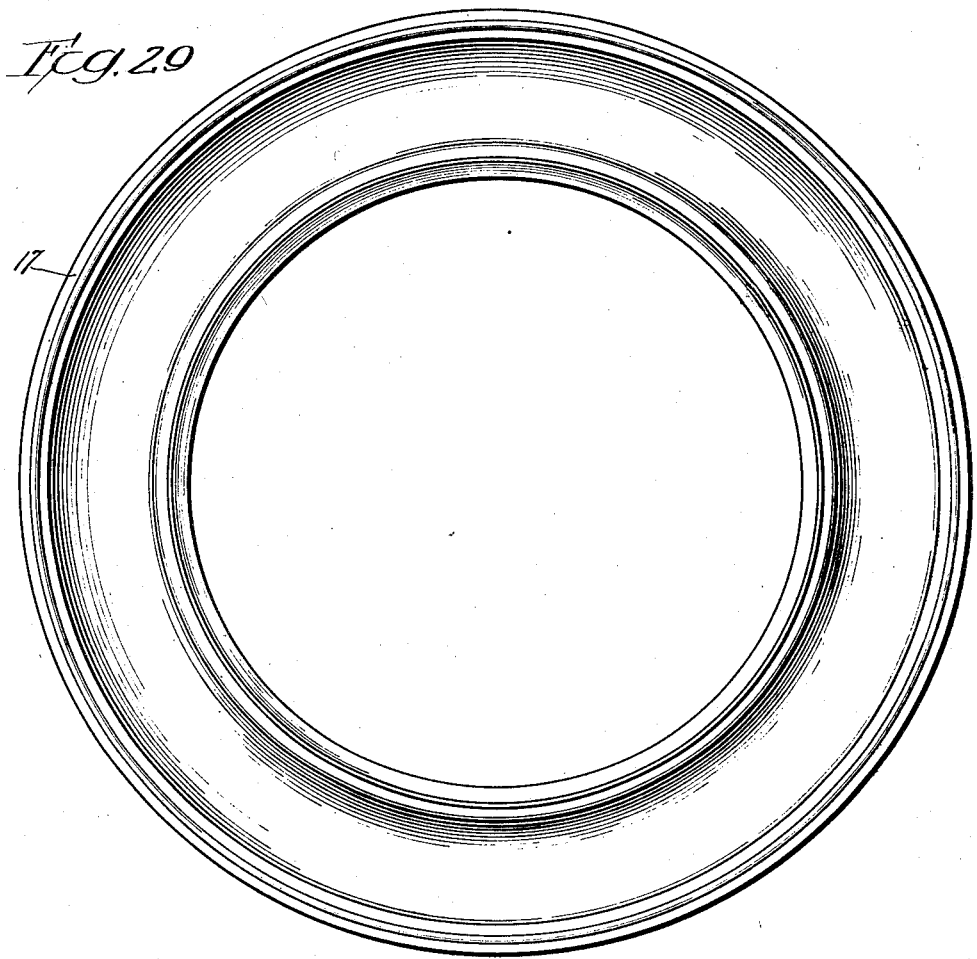

Figure 29 is an enlarged plan of one section of the mold.

Figure 30:
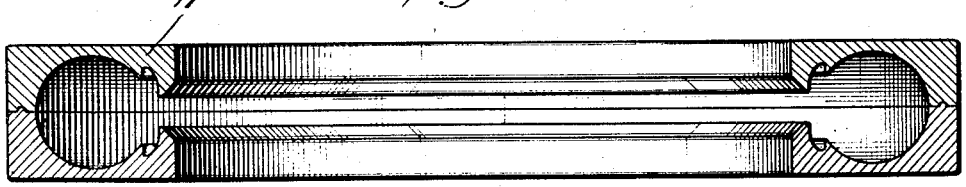

Figure 30 is a transverse section through the mold.

Figure 1:
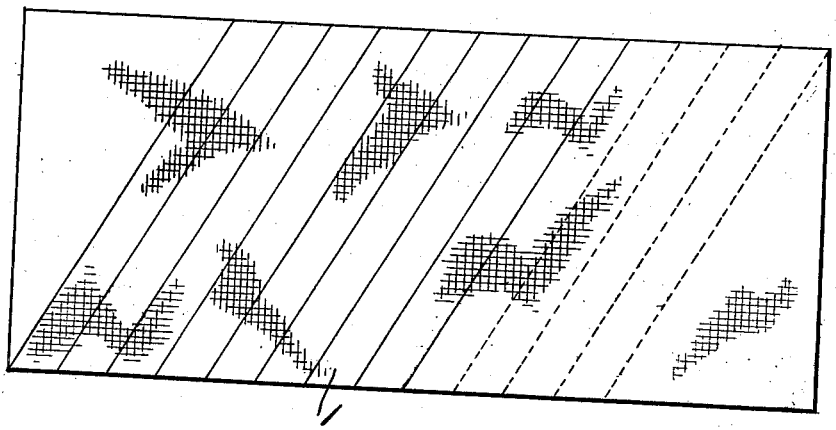
Figure 1 shows a section of the fabric from which pneumatic tire casings are made by the process or method embodying the principles of the invention.
Figure 2:
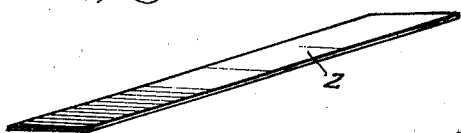
Figure 2 shows a strip cut from said fabric.
Figure 3:
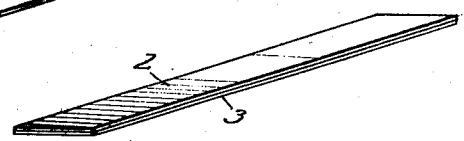
Figure 3 shows another and similar strip added to said fabric, the latter being rubberized, in the ordinary manner, whereby a two-ply strip is formed, the fabric being cut on the bias with the bias of one strip extending at an angle to the other strip so that the composite strip thus formed may stretch.
Figure 4:
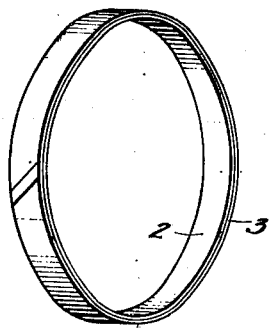
Figure 4 is a perspective of the annular band formed by the connecting together of the two ends of the two ply strip.

As thus illustrated, the fabric 1 shown in Figure 1 may be of any suitable or known or proved character, such as the ordinary rubberized fabric, and is cut on the bias as shown. Two bias strips of sufficient length and width are cut from this fabric, and laid together and formed into a band or ring, as illustrated in Figures 2, 3 and 4, so that a band or ring of rubberized fabric comprising a first ply 2 and the second ply 3 is formed of the desired or necessary size and strength. If desired, the inner ply 2 may have its inner surface vulcanized, so that this surface will not stick to anything, such as a drum upon which the band is made during the process of making the tire casing. The sectional or expansible ring 4, the construction of which is shown in Figures 22, 23 and 24, is then inserted in the band shown in Figure 4, and is expanded or brought into complete annular form, by any suitable or desirable means, to stretch the band in the manner shown in Figure 5. This ring or annular member 4 is in effect an undersized expansible mandrel, as it stretches the fabric, but it does not give the tire the ultimate shape desired, of course, because it is too small in cross section. Thereafter the molding ring 5 is placed upon the screws 6 of the machine shown in Figure 6, and the marginal portions of the fabric band are then clamped tightly to the sides of this molding ring by means of the two clamping rings 7, as shown in Figure 7, so that the interior of the partially formed tire casing is rendered air tight and is made ready for inflation. Next the tire casing is inflated, as shown in Figure 8, by air introduced through the valve tube 8, or in any suitable manner. Next the beads or retaining members 9, which may be the ordinary vulcanized strips of rubber, either yielding or non-yielding, are applied to the sides of the tire casing, as shown in Figure 9, and thereafter the third ply 10 of rubberized fabric is applied to the outer surface of the partially formed casing, as shown in Figure 10, and over the said beads or retaining members. Next, as shown in Figure 11, the fourth ply or strip 11 of rubberized fabric is placed on the outer surface of the partially formed tire casing, by stretching it over and causing it to adhere to the outer surface of the third ply 10 in a manner that will be readily understood. Afterwards, as shown in Figure 12, a layer of rubber, or rubber composition 12 is applied to the tread portion of the casing, in any suitable or desired manner. Next the breaker strip 13, or strip of fabric of any suitable character, is applied to the tread of the tire casing as shown in Figure 13, and thereafter the reinforcing strips 14, as shown in Figure 14, are applied to the sides of the tire casing to extend over the beads or retaining members previously mentioned. After this, as shown in Figure 15, the tread rubber 15 is applied to the tread and sides of the tire casing, and finally the reinforcing strips 16 are applied to the sides of the casing, as shown in Figure 16, thus completing the process of building up the structure of the tire casing. This, obviously, can all be done while the elements are held in the manner shown in Figure 6, while the ring or mandrel 4 remains in position to hold the tread portions as shown, and when this building process has been completed the screws 6 are operated to disconnect the molding ring 5 therefrom, leaving the built-up tire casing (which at this time is only partially inflated) tightly clamped upon the said molding ring. The tire casing and the molding ring clamped thereon are then placed in the mold or vulcanizing press 17, as shown in Figure 17, and further air or fluid pressure is introduced through the valve tube 8 to inflate the tire casing into firm contact with the interior of the mold or press, and the latter tightly clamps the beads or rim portions of the tire casing against the beveled sides 18 of said molding ring. The tread portions are stretched away from the ring or mandrel 4, as shown, by the fluid pressure. In this way the rim portions of the tire casing are actually vulcanized to the sides of the molding ring 5, and it will be observed, at this time, that the sectional or expansible ring 4 is allowed to drop down a distance, as shown in Figure 17, because of the final expansion of the tire casing, against the interior surface of the mold.

It will thus be seen that the surplus marginal portions 19 of the fabric incorporated in the tire casing which marginal portions extend outside of the beads or rim portions of the tire casing, are necessary only in the process of making the tire casing by this method and are employed merely to enable the clamping rings 7 to tightly clamp the tire casing to the molding ring. In other words, the tire is stretched to a larger diameter by the inflation thereof, and these edge portions 19 not only serve to hermetically seal the base of the tire, but serve also to prevent the stretching operation from pulling the bead portions 9 of the tire out of position. For this reason, therefore, these portions 19 must have strength to serve as anchors, as well as sufficient rubber to seal the tire against leakage. The next step, therefore, in the general method of thus building up and vulcanizing the tire casing, consists in removing the expansible or sectional ring 4, as shown in Figure 19, through the slot 20 in the base of the tire casing. Thereafter the surplus portions 19 are cut away or trimmed off, leaving the tire casing in the condition shown in Figure 20, the casing having been fully vulcanized, of course, before being removed from the mold or vulcanizing press. As shown, the surplus marginal portions 19 are utilized to hold the materials in place during the building of the tire. As these surplus edge portions are formed of fabric and rubber, they will adhere to the ring 5, as previously explained, but these edge portions become more effective for this purpose when positively clamped, as by the rings 7, or by any suitable means, and it is obvious that this positive clamping and compression of the surplus edge portions is desirable when air or other fluid pressure in introduced to supplement the mandrel or support 4 during the building of the tire. In other words, under such circumstances, and during the building of the tire, the surplus edge portions are required to form a seal as well as to anchor the materials in place, before the surplus edge portions can be held or anchored in any suitable or desired manner, so far as their function of merely holding the inner plies in position on a core or mandrel during the building of the tire is concerned. As stated, the tire casing is practically vulcanized to the sides of the molding ring 5, but it can be stripped therefrom in any suitable or desired manner, after removing the clamping rings 7, thus leaving the surplus marginal portions 19 free and in position to be sheared or cut away in any suitable or desired manner.

Thus, by the process or method shown and described, and by means of any suitable or desired apparatus, a clincher tire casing, or other tire casing having a divided base, is made without the necessity of using an air bag to maintain it in expanded condition during the vulcanizing operation. Also, as shown and described, no mandrel is necessary in the vulcanizing of the tire casing, as is customary with certain methods heretofore employed. Instead of using either the air bag or the mandrel, the invention herein shown and described contemplates the introduction of air directly into the interior of the tire casing, and the maintaining of the latter in air tight condition during vulcanization. The air bags ordinarily employed in certain old methods are more or less expensive and are comparatively short lived, as they are subject to the heat of the vulcanizing operation. The mandrels employed in some methods to keep the tire casings fully expanded against the interior surfaces of the mold or press are also somewhat expensive, and are heavy and cumbersome. As is well known, there are some objections and some disadvantages connected with the use of either air bags or mandrels. With the invention shown and described, however, these disadvantages and objections are overcome, inasmuch as air or other fluid is introduced directly into the interior of the tire casing, after the latter is placed in the mold or press. The portions 19 are surplus material, of course, in the sense that they are only necessary in the making of the tire by this particular method, and are not necessary in the use of the tire, but they may be cut off when the tire is used, as may be desired. As shown, those surplus trimmed edges 19 are formed by only the inner plies of the tire, for the plies 10 and 11 do not form any part of these surplus portions. As shown and described, the initial stretching of the fabric band is produced by means of the sectional ring 4, but it is obvious that any suitable means can be employed in doing this, without departing from the spirit of the invention, so far as the broader aspects of the invention are concerned.

It will be seen that the initial inflation of the tire casing is by means of air introduced directly into the casing itself, in direct contact with the interior of the casing. At this time, even as afterward, the partially formed tire casing is held in place by tightly clamping the surplus edge portions 19 of the rubberized fabric, so that these surplus portions of the tire are essential for both the first and the second inflation of the casing, and for the vulcanization of the finished tire casing.

The intent and purpose, therefore, of the surplus edge portions 19, is that by this expedient the tire casing is so effectively sealed and held in place that a vulcanizing air bag is not necessary. The portions 19 are provided specially for this purpose, and are preferably in the form of marginal extentions of the first or inner plies of the tire casing, as previously explained. These inner plies 2 and 3, as shown in Figures 2, 3, and 4, and as indicated in Figure 5 and other views of the drawings, are trimmed or cut to provide straight edge portions, so that these flat surplus portions 19 are trimmed and have clean or true or even edges, preferably, as shown, before the finished tire casing is placed in the vulcanizing mold. In other words, the surplus portions 19 are provided intentionally and with particular reference to the process of building and vulcanizing the tire, and are not merely the unavoidable and more or less ragged edge portions which sometimes occur in the making of tire casings, and with the process shown and described, the surplus portions 19 are formed by material prepared especially for this purpose. While these portions 19 can be removed after the tire is vulcanized, it is obvious that they can be removed at any time thereafter or in any suitable or desired manner, as may be found necessary or desirable.

It will be seen, therefore, that the tire when built complete in tire form is relatively small but is stretched to a larger size by fluid pressure in direct contact with the inner surface thereof while the casing is hermetically sealed at its base and is firmly anchored in place by surplus trimmed edge portions specially formed or prepared and provided for this particular purpose. Also, as explained, these specially prepared trimmed edge portions are used to hold the casing in place during the building thereof. These portions 19 are, therefore, surplus material in the sense that they are adapted to be cut off or removed without doing the tire any harm, but the invention is not limited to the final removal of these portions.

The two strips or layers 2 and 3 constitute the lining of the tire, and this lining is made and then stretched as shown in Figure 5, while the margin of surplus material at opposite sides thereof is free or unheld, and before the building of the tire thereon. Thereafter, of course, said lining is again stretched with the complete tire for the vulcanizing operation, but this time said surplus material is held to anchor and seal the tire. Thus said lining is formed by cutting and superposing fabric to form a band which is much too wide for the tire, so that webs are formed outside the tire to provide anchoring portions which are quite wide and which are of predetermined form and thickness, being extensions of the inner layers of fabric. Of course, the flat band which is first made to form said lining, as shown in Figure 4, can be stretched to a larger diameter in any suitable or desired manner, while its wide surplus marginal portions with straight trimmed edges remain free and unheld, and before the other layers of fabric and rubber are superposed thereon in the building of the tire.

Of course, the fabric or fibrous material may be a sheet of material of any suitable or desired character, such as those employed in making pneumatic tires of different kinds, but regardless of the character of the material, it is preferably cut on the bias, as shown, and a plurality of layers or inner plies combine to form the surplus edge portions shown and described. Preferably, the outer plies extend around below the retaining members 9, to hold the latter in position, and terminate short of the flaps or webs or surplus edge portions, thus permitting these surplus portions to be clamped in place while the tire is being built on the ring or annular member 4, which latter is in the nature of an undersized mandrel or core, being much too small in cross section to give the tire the desired shape. The ring member 4, however, serves as the building means upon which to initially stretch the materials, as shown in Figure 5, and upon which to continue the building up of the tire as shown in Figures 7 to 16 inclusive, the partial inflation of the tire supplementing the ring or mandrel 4 in order to give the tire the approximate shape and size desired for the ultimate product. However, when the raw carcass of the tire is placed in the mold, as shown in Figure 17, the expansion of the tire causes the tread portions to move away from the ring or mandrel 4, as the latter is not expansible for the final stretching of the tire, thus permitting the mandrel 4 to drop down as shown in Figure 17, but the ring 4 remains in the tire during the final stretching and vulcanizing thereof. Thus the building means or support 4 is loose in the tire during the vulcanizing operation, as the result of the final stretching of the tire to the ultimate diameter desired for the finished product. Of course, though, as shown and described, after the vulcanized tire is stripped from the ring 5 the ring or mandrel or core 4 may then be removed from the interior of the tire, in a manner that will be readily understood.

It will be seen that the cutting and stretching of the plies 2 and 3, or any suitable tire materials, results in the formation of the surplus edge portions, but these surplus edge portions are left unrestrained and are not held in any way whatever until after the preliminary stretching of the tire materials on the ring-like support or annular member 4 shown in the drawings. During the building of the tire on the ring or mandrel 4 said surplus edge portions are restrained or held, as shown in Figures 7, 8, 9, 10, 11, 12, 13, 14, 15 and 16, and they are held during the intermediate stretching of the materials as shown in Figure 8, but the preliminary stretching as shown in Figure 5 is accomplished before the surplus edge portions are held or restrained in any way whatever, for they are not clamped or pressed or held during this preliminary stretching of the tire materials. Thus the said surplus edge portions are part of the essential tire materials, and not a part of something which the tire does not need, or which could be omitted without affecting the ultimate strucutre and character of the tire itself. In other words, the plies 2 and 3 are not something additional to the tire structure, but are an essential part of the tire structure itself, and hence these surplus edge portions are extensions of the tire structure proper, and are not something which are formed by adding unnecessary plies or other layers of material to the tire structure. In other words, these surplus edge portions are predetermined extensions of plies or layers or portions of the tire materials which are essential for the strength and structure of the tire itself.

What I claim as my invention is:

1. The process of making a pneumatic tire casing, comprising the building and formation of the casing over a ring or annular member, with surplus trimmed edge portions, using these edge portions of predetermined form and purpose to hold the casing in place during final vulcanization of the tire while the tread is stretched to a larger diameter than the ring, removing the ring from the vulcanized tire, and thereafter removing said surplus edge portions, in which said surplus edge portions are formed by marginal portions of a band of rubberized fabric, so that these trimmed edge portions are formed by only the inner plies of the tire, and in which retaining members are secured to the band adjacent to said surplus edge portions, after the band is partially stretched, and after said surplus edge portions are clamped in position to hermetically seal the interior of the tire casing thus partially formed.

2. The process of making a pneumatic tire casing, comprising the building and formation of the casing over a ring or annular member, with surplus trimmed edge portions, using these edge portions of predetermined form and purpose to hold the casing in place during final vulcanization of the tire while the tread is stretched to a larger diameter than the ring, removing the ring from the vulcanized tire, and thereafter removing said surplus edge portions, in which the following steps occur, to-wit: (1) the formation of a band of fabric from a plurality of plies or layers of rubberized fabric; (2) the stretching of said band to increase the diameter thereof along its tread, leaving its edge portions practically unstretched; (3) clamping said surplus edge portions which are formed by the edge portions of said band in place to hermetically seal the interior of the tire casing thus partially formed; (4) partially inflating the uncompleted tire casing; (5) applying retaining members to the side portions of the partially formed tire casing; (6) applying additional fabric to the exterior of the partially formed tire casing; (7) building and forming the rubber tread and sides of the tire casing; (8) further inflating the tire casing, and thereafter vulcanizing it while inflated by the introduction of a fluid directly into the interior thereof; (9) releasing said surplus edge portions, and thereafter trimming off or cutting away said surplus edge portions.

3. The process of making a pneumatic tire casing, comprising the building and formation of the casing over a ring or annular member, with surplus trimmed edge portions, using these edge portions of predetermined form and purpose to hold the casing in place during final vulcanization of the tire while the tread is stretched to a larger diameter than the ring, removing the ring from the vulcanized tire, and thereafter removing said surplus edge portions, in which said surplus edge portions are formed by making a band of rubberized fabric of greater width than is necessary for the construction of the tire casing, and stretching said band to a greater diameter, leaving said surplus edge portions practically unstretched.

4. The process of making a pneumatic tire casing, comprising the building and formation of the casing with suitable trimmed edge portions, by stretching the materials over building means, inflating and stretching the casing away from said building means, thereafter vulcanizing the casing while thus inflated and held in stretched condition, said edge portions being held and temporarily vulcanized to the surface of a metal ring, so that the stretching of the casing can be produced by introducing a fluid directly into the interior of the casing, said trimmed edge portion being specially formed and provided for this particular purpose, thereafter stripping the casing from said ring, and removing said building means from the interior of the vulcanized tire.

5. The process specified in claim 4, in which the tire casing is partially inflated before vulcanization, and thereafter fully inflated before the step of molding and vulcanization.

6. The process of making a pneumatic tire casing, comprising the building up of the casing, by means of successively applied layers of fabric and rubber or rubber composition, inflating and then by partially expanding the casing before the structure thereof is completed, so that some of the materials are applied after said partial expansion, and thereafter inflating and thereby fully expanding the casing and vulcanizing it while thus maintained in stretched condition, the inflation in each case being brought about by introducing a fluid directly into the interior of the casing, to obviate the necessity of using an air bag or an inner tube, while maintaining the casing hermetically sealed and firmly anchored by tightly holding the edges thereof in fixed position, said edges being specially formed and prepared for this particular purpose.

7. The process of making a pneumatic tire casing which comprises the gradual building of the tire by means of any suitable or desired materials over a ring which partially stretches the tread portions into shape, and by using inflation and expansion in the shaping of the tire casing, the initial inflation of the tire casing in the making thereof being accomplished by introducing a fluid directly into the interior of the casing, in direct contact therewith, while the casing is firmly clamped or held and sealed by specially prepared surplus material at the base thereof to prevent leakage of the fluid pressure, so that the tire is held at its edges during the expansion to increase the diameter thereof, and thereafter vulcanizing the tire casing while thus subject to the action of direct fluid pressure therein, with the tread portions forced away from said ring, and finally removing said ring from the vulcanized tire.

8. The process of making a pneumatic tire, comprising the building thereof in general tire form, but of less diameter than the ultimate product, by partially stretching the carcass on a ring or mandrel, providing the tire with predetermined surplus fibre material having trimmed edges, expanding and stretching the tire to full diameter by fluid pressure in direct contact with the interior thereof, so that the tread portions are stretched away from said mandrel, using said surplus fibre material to hermetically seal and hold the tire in position during said expanding and stretching thereof, and vulcanizing the tire while thus maintained in ultimate tire form, whereby the tire is one size when built complete and is larger when expanded by pressure in direct contact with the inner surface thereof, and finally removing the pressure and the mandrel from the vulcanized tire, comprising also the use of said surplus fibre material to hold the tire in place during the building thereof.

9. The process of making a pneumatic tire, comprising the building of the tire complete and in tire form in unvulcanized condition, over a ring or mandrel, expanding and stretching the structurally complete tire away from said mandrel to a larger diameter by fluid pressure in direct contact with the inner surface thereof, so that the tread portions are held away from the ring, and vulcanizing the tire while thus expanded, comprising the provision of surplus fibre trimmed edge portions on the tire, the use of these trimmed edge portions to hold the tire in position during the building thereof, and the use of said trimmed edge portions to hermetically seal and hold the tire in place and prevent leakage of the fluid pressure during the stretching of the tire and also during the vulcanizing operation.

10. The process of making a pneumatic tire, comprising the building thereof in general tire form, but of less diameter than the ultimate product, by partially stretching the carcass on a ring or mandrel, providing the tire with predetermined surplus fibre material having trimmed edges, expanding and stretching the tire to full diameter by fluid pressure in direct contact with the interior thereof, so that the tread portions are stretched away from said mandrel, using said surplus fibre material to hermetically seal and hold the tire in position during said expanding and stretching thereof, and vulcanizing the tire while thus maintained in ultimate tire form, whereby the tire is one size when built complete and is larger when expanded by pressure in direct contact with the inner surface thereof, and finally removing the pressure and the mandrel from the vulcanized tire, including the provision of a cured or partially vulcanized inner surface for the tire, previous to the stretching thereof, to prevent the fluid pressure from entering the wall of the tire.

11. The process of making a pneumatic tire, comprising the building thereof in general tire form, but of less diameter than the ultimate product, by partially stretching the carcass on a ring or mandrel, providing the tire with predetermined surplus fibre material having trimmed edges, expanding and stretching the tire to full diameter by fluid pressure in direct contact with the interior thereof, so that the tread portions are stretched away from said mandrel, using said surplus fibre material to hermetically seal and hold the tire in position during said expanding and stretching thereof, and vulcanizing the tire while thus maintained in ultimate tire form, whereby the tire is one size when built complete and is larger when expanded by pressure in direct contact with the inner surface thereof, and finally removing the pressure and the mandrel from the vulcanized tire, including the steps of building the raw carcass on a ring or annular member which serves to partially stretch the tread and which is allowed to remain in the tire during the final stretching and vulcanizing thereof, so that the tread is finally stretched away from said ring, and providing said surplus fibre material in the form of two opposite edge portions which are trimmed and thereby formed with clean edges before being incorporated in the tire.

12. The process of making a pneumatic tire casing having oppositely disposed surplus edge portions formed of fabric cut and trimmed to provide each surplus portion with a clean edge, whereby said surplus portions are adapted to be removed before the tire casing is placed in the rim of the vehicle wheel, comprising the use of a core or mandrel upon which to build the raw carcass, the use of said trimmed edge portions to hermetically seal and anchor the base of the casing while the structurally complete tire is expanded and stretched away from said mandrel to a larger diameter by fluid pressure introduced between the outer surface of the mandrel and the inner surface of the tire, and during the vulcanization of the tire, substantially as described.

13. In a process of making pneumatic tires, the cutting and superposing of fabric to form a lining provided with a substantial margin of surplus material having trimmed edges, to extend a predetermined distance outside of the tire being made, stretching said lining while said surplus thereof is free and unheld, building the tire complete on said lining, inflating and stretching the tire by fluid pressure in direct contact with said lining while said surplus material thereof is held, so that the size of the tire is increased, and vulcanizing the tire while thus maintained in expanded condition.

14. In a process of making pneumatic tires, the cutting and superposing of fabric to form a lining provided with a substantial margin of surplus material having trimmed edges to extend a predetermined distance outside of the tire being made, stretching said lining while said surplus thereof is free and unheld, building the tire complete on said lining, inflating and stretching the tire by fluid pressure in direct contact with said lining while said surplus material thereof is held, so that the size of the tire is increased, and vulcanizing the tire while thus maintained in expanded condition, said surplus material being held during the building of the tire thereon.

15. In a process of making pneumatic tires, the cutting and superposing of fabric to form a lining provided with a substantial margin of surplus material having trimmed edges to extend a predetermined distance outside of the tire being made, stretching said lining while said surplus thereof is free and unheld, building the tire complete on said lining, inflating and stretching the tire by fluid pressure in direct contact with said lining while said surplus material thereof is held, so that the size of the tire is increased, and vulcanizing the tire while thus maintained in expanded condition, said surplus material being of sufficient strength and thickness to both hermetically seal and firmly anchor the base of the tire during said inflation and vulcanizing thereof.

16. The process of making a pneumatic tire having a strong fabric lining which is essential for the proper construction of the tire, and for the strength which the tire must necessarily have, comprising the formation of said lining of bias cut strips which are greater in width than is ordinarily necessary and with predetermined surplus marginal portions having trimmed edges, the initial stretching of said lining over a ring or annular member while said surplus portions are free and unheld, building the balance of the raw carcass on said lining in such a manner that said multi-ply surplus edge portions are formed by the inner plies only, and thereafter stretching said lining with the complete tire carcass while said surplus portions are securely held to both anchor and seal the base of the tire for the use of fluid pressure in direct contact with said lining to stretch the tire to a larger size for the final vulcanizing thereof.

17. The process of making a pneumatic tire casing, comprising the building and formation of the casing with surplus trimmed edge portions, using these edge portions of predetermined form and purpose to hold the casing in place during final vulcanization of the tire, and thereafter removing said surplus edge portions, in which said surplus edge portions are formed by marginal portions of a band of rubberized fabric, so that these trimmed edge portions are formed by only the inner plies of the tire, and in which retaining members are secured to the band adjacent to said surplus edge portions, after the band is partially stretched, and after said surplus edge portions are clamped in position to hermetically seal the interior of the tire casing thus partially formed.

18. The process of making a pneumatic tire casing, comprising the building and formation of the casing with surplus trimmed edge portions, using these edge portions of predetermined form and purpose to hold the casing in place during final vulcanization of the tire, and thereafter removing said surplus edge portions, in which the following steps occur, to-wit: (1) the formation of a band of fabric from a plurality of plies or layers of rubberized fabric; (2) the stretching of said band to increase the diameter thereof, along its tread, leaving its edge portions practically unstretched; (3) clamping said surplus edge portions which are formed by the edge portions of said band in place to hermetically seal the interior of the tire casing thus partially formed; (4) partially inflating the uncompleted tire casing; (5) applying retaining members to the side portions of the partially formed tire casing; (6) applying additional fabric to the exterior of the partially formed tire casing; (7) building and forming the rubber tread and sides of the tire casing; (8) further inflating the tire casing, and thereafter vulcanizing it while inflated by the introduction of a fluid directly into the interior thereof; (9) releasing said surplus edge portions, and thereafter trimming off or cutting away said surplus edge portions.

19. The process of making a pneumatic tire casing, comprising the building and formation of the casing with surplus trimmed edge portions, using these edge portions of predetermined form and purpose to hold the casing in place during final vulcanization of the tire, and thereafter removing said surplus edge portions, in which said surplus edge portions are formed by making a band of rubberized fabric of greater width than is necessary for the construction of the tire casing, and stretching said band to a greater diameter, leaving said surplus edge portions practically unstretched.

20. The process of making a pneumatic tire casing, comprising the formation of the casing with suitable trimmed edge portions, inflating and stretching the casing, and thereafter vulcanizing the casing while thus inflated and held in stretched condition, said edge portions being held and temporarily vulcanized to the surface of a metal ring, so that the stretching of the casing can be produced by introducing a fluid directly into the interior of the casing, said trimmed edge portions being specially formed and provided for this particular purpose, thereafter stripping the casing from said ring, in which the tire casing is partially inflated before vulcanization, and thereafter fully inflated before the step of molding and vulcanization.

21. The process of making a pneumatic tire, comprising the building thereof in general tire form, but of less diameter than the ultimate product, providing the tire with predetermined surplus fibre material having trimmed edges, expanding and stretching the tire to full diameter by fluid pressure in direct contact with the interior thereof, using said surplus fibre material to hermetically seal and hold the tire in position during said expanding and stretching thereof, and vulcanizing the tire while thus maintained in ultimate tire form, whereby the tire is one size when built complete and is larger when expanded by pressure in direct contact with the inner surface thereof, comprising also the use of said surplus fibre material to hold the tire in place during the building thereof.

22. The process of making a pneumatic tire, comprising the building of the tire complete and in tire form in unvulcanized condition, expanding and stretching the structurally complete tire to a larger diameter by fluid pressure in direct contact with the inner surface thereof, and vulcanizing the tire while thus expanded, comprising the provision of surplus fibre trimmed edge portions on the tire, the use of these trimmed edge portions to hold the tire in position during the building thereof, and the use of said trimmed edge portions to hermetically seal and hold the tire in place and prevent leakage of the fluid pressure during the stretching of the tire and also during the vulcanizing operation.

23. The process of making a pneumatic tire, comprising the building thereof in general tire form, but of less diameter than the ultimate product, providing the tire with predetermined surplus fibre material having trimmed edges, expanding and stretching the tire to full diameter by fluid pressure in direct contact with the interior thereof, using said surplus fibre material to hermetically seal and hold the tire in position during said expanding and stretching thereof, and vulcanizing the tire while thus maintained in ultimate tire form, whereby the tire is one size when built complete and is larger when expanded by pressure in direct contact with the inner surface thereof; including the provision of a cured or partially vulcanized inner surface of the tire, previous to the stretching thereof, to prevent the fluid pressure from entering the wall of the tire.

24. The method of making a pneumatic tire casing, comprising the building of the raw carcass on a ring-like support, by preliminarily stretching the tire materials tightly on the periphery of said annular support, forming surplus portions along the edges of the base of the unvulcanized carcass, to provide strong flaps which remain unrestrained until after said stretching of the materials on said support, thereafter using said flaps to securely anchor the edges and seal the open base of the carcass, with said ring-like support therein, expanding the carcass to a larger diameter, so that the tread portions thereof are forced away from said support, by fluid pressure introduced between the outer surface of the support and the inner surface of the casing itself, vulcanizing the carcass while thus expanded and held away from said annular support, and while said anchoring flaps are held to prevent displacement of said base of the carcass, as well as to prevent leakage of the fluid pressure, and removing the pressure from the tire.

25. A process as specified in claim 24, said flaps being used to hold the carcass in place during the building thereof.

26. A process as specified in claim 24 said flaps being formed by cutting the inner plies for flat stock and forming them at this time much wider than is necessary in the ordinary method of building a tire casing.

27. The method of making a pneumatic tire, comprising the building of the raw carcass with surplus edge portions forming flaps, said flaps being unrestrained during the preliminary stretching of the materials on a support, thereafter using these flaps to retain the materials in position during the stretching of the tire materials and the building of the carcass on said support, and thereafter using these same flaps to securely anchor the edges and seal the open base of the carcass, during the final stretching thereof to a larger diameter, and during vulcanization thereof.

28. A process as specified in claim 27 the said flaps being formed by the inner plies only, whereby said use of the flaps during the building of the tire may become effective by positively clamping and compressing each flap.

JOHN L. G. DYKES.